(12) United States Patent
Liberg et al.

(10) Patent No.: US 11,716,662 B2
(45) Date of Patent: Aug. 1, 2023

(54) MOBILITY MANAGEMENT WITH BASE STATION USING DUTY CYCLES

(71) Applicant: Telefonaktiebolaget LM Ericsson (publ), Stockholm (SE)

(72) Inventors: Olof Liberg, Enskede (SE); David Sugirtharaj, Lund (SE); Emma Wittenmark, Lund (SE); Mai-Anh Phan, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 229 days.

(21) Appl. No.: 17/274,275

(22) PCT Filed: Sep. 19, 2019

(86) PCT No.: PCT/SE2019/050890
§ 371 (c)(1),
(2) Date: Mar. 8, 2021

(87) PCT Pub. No.: WO2020/060474
PCT Pub. Date: Mar. 26, 2020

(65) Prior Publication Data
US 2021/0297918 A1    Sep. 23, 2021

Related U.S. Application Data

(60) Provisional application No. 62/733,404, filed on Sep. 19, 2018.

(51) Int. Cl.
| | |
|---|---|
| H04W 36/00 | (2009.01) |
| H04W 36/26 | (2009.01) |
| H04W 24/02 | (2009.01) |
| H04W 36/22 | (2009.01) |
| H04W 72/0453 | (2023.01) |

(52) U.S. Cl.
CPC ........... *H04W 36/26* (2013.01); *H04W 24/02* (2013.01); *H04W 36/00837* (2018.08); *H04W 36/22* (2013.01); *H04W 72/0453* (2013.01)

(58) Field of Classification Search
None
See application file for complete search history.

(56) References Cited

U.S. PATENT DOCUMENTS

| | | |
|---|---|---|
| 2012/0077486 A1 | 3/2012 | Park et al. |
| 2012/0155306 A1 | 6/2012 | Kim et al. |
| 2018/0092093 A1* | 3/2018 | Ramaswamy ........... H04B 1/58 |

* cited by examiner

*Primary Examiner* — Suhail Khan
(74) *Attorney, Agent, or Firm* — Coats & Bennett, PLLC

(57) ABSTRACT

A network-based method allows a network to optimize its control of radio resource usage by directing connected and idle mode User Equipment (UEs) (10) to another network node, e.g. a neighbor cell, having a better duty cycle, or by configuring the UEs to use another frequency band served by the same network node or a different network node. Signaling its duty cycle budget to the UEs allows the UEs to optimize their idle mode operation by performing cell re-selection to a network node which has a better duty cycle budget.

20 Claims, 17 Drawing Sheets

MOBILITY MANAGEMENT WITH BASE STATION USING DUTY CYCLES

RELATED APPLICATIONS

This application claims priority to U.S. Application No. 62/733,404, filed 19 Sep. 2018, disclosure of which is incorporated in its entirety by reference herein.

TECHNICAL FIELD

The present disclosure relates generally to mobility in cellular networks and, more particularly, to mobility in duty cycle (DC) limited cellular networks.

BACKGROUND

Wireless communication networks enable voice and data communications to mobile devices. They are ubiquitous in many parts of the world, and continue to advance in technological sophistication, system capacity, data rates, bandwidth, supported services, and the like. A basic model of one type of wireless networks, generally known as "cellular," features a plurality of fixed network nodes (referred to as base stations, radio base stations, base transceiver stations, serving nodes, NodeBs, eNodeBs, eNBs, and the like), each providing wireless communication service to a large plurality of mobile devices (referred to as mobile terminals, User Equipment or UE, and the like) within a generally fixed geographical area, known as a cell or sector.

While one aspect of wireless communication development is towards ever-higher bandwidth and data rates (e.g., supporting a wide variety of services delivered to sophisticated cellular phones such as "smartphones"), another recent development is in the opposite direction—i.e., providing limited-bandwidth, low-data-rate service to simple, cheap devices with very low power budgets. In Release 13, the Third Generation Partnership Project (3GPP) standardized the Narrowband Internet of Things (NB-IoT). NB-IoT aggressively addresses the extremely low cost market with less than 200 KHz of spectrum and flexibility to deploy concurrently with legacy networks or outside of active legacy spectrum. This new radio access technology is intended to provide connectivity to services and applications demanding qualities such as reliable indoor coverage and high capacity in combination with low system complexity and optimized power consumption.

The Multefire Alliance (MFA), which is an independent consortium, is currently adapting NB-IoT for operation in an unlicensed spectrum. In a first release, NB-IoT will be made available in the United States and in the European Union in the 800 and 900 MHz frequency bands.

In the EU, the European Telecommunications Standards Institute (ETSI) is defining the regulations for equipment operating in an unlicensed spectrum. One important regulation is the Activity Duty Cycle requirement, which defines the allowed equipment activity level. In the bands targeted by NB-IoT, the IoT devices operating in the uplink is expected to be allowed to use an activity duty cycle in the range of, at most, 10% for frequency band 54, and only 2.5% for frequency band 47b. Additionally, there are other frequency bands in the 900 MHz region which only allow a duty cycle of 1%. Depending on the frequency band used, this implies that a device may transmit during 360 seconds or 90 seconds every hour. In the downlink it is expected that the base station will be permitted to make use of an activity duty cycle in the range of 10%. The base station is therefore permitted to transmit for 360 seconds per hour.

The activity duty cycle is typically specified per frequency band. Equipment operating in multiple bands may use the full duty cycle in each of the supported bands to boost its overall rate of activity.

SUMMARY

Aspects of the present disclosure and their embodiments provide a network based method that allows a network to optimize its control of the radio resource usage. In such embodiments, the network directs connected and idle mode UEs to another network node, such as a neighbor base station or a neighbor cell, for example, that has a "better" activity duty cycle budget (i.e., the neighbor base station or neighbor cell has a larger amount of its activity duty cycle budget remaining, meaning that it has consumed a lesser amount of its activity duty cycle budget). In another embodiment, the network configures the UE to use another frequency band served by the same network node. Additionally, embodiments of the present disclosure describe new signaling from the network to wireless devices, such as the UEs, concerning the network's activity duty cycle status. Signaling the activity duty cycle status will allow wireless devices to optimize their idle mode operation, including making decisions whether to request a connection setup or remain in idle mode.

Embodiments of the present disclosure provide a methods for operating a cellular system in a duty cycle controlled radio frequency band. Additionally, certain embodiments may also provide one or more of the following technical advantage(s). By way of example only, the embodiments described herein support spectrally efficient cellular operation in a spectrum associated with duty cycle restrictions. In one embodiment, for example, spectral efficiency is achieved by distributing the UEs, and thus traffic, to a network node having more spare duty cycle.

Accordingly, one embodiment of the present disclosure provides a first method, performed by a serving base station of a serving cell, of operating in a wireless communication network operating according to a duty cycle. In this first method, the respective duty cycle budgets for the serving cell and one or more neighbor cells are monitored. Each duty cycle defines, for its respective cell, a percentage of time, within an observation interval, in which the respective cell is permitted to communicate data. Additionally, according to the first method, a User Equipment (UE) is redirected to a neighbor cell based on the duty cycle budget for the serving cell.

One embodiment relates to a network node, such as a serving base station, in a wireless communication network operating according to a duty cycle. The network node, according to the present disclosure, comprises an interface circuit and a processing circuit. The interface circuit is configured for communication with one or more cells in the wireless communication network. The processing circuit is configured to monitor respective duty cycle budgets for the serving cell and one or more neighbor cells. Each duty cycle defines, for its respective cell, a percentage of time, within an observation interval, in which the respective cell is permitted to communicate data. The processing circuit is also configured to redirect the UE to a neighbor cell based on the duty cycle budget for the serving cell.

Another embodiment provides a second method, also performed in a serving cell, of operating in a wireless communication network operating according to a duty cycle.

In this method, the respective duty cycle budgets for a serving cell and one or more neighbor cells are monitored. The respective duty cycle budgets of the serving cell, and the one or more neighbor cells are then broadcast to a User Equipment (UE). The UE uses the broadcast duty cycle budgets in cell selection or cell reselection. As above, each duty cycle defines, for its respective cell, a percentage of time, within an observation interval, in which the respective cell is permitted to communicate data.

Still another embodiment provides a network node, such as a serving base station, of operating a wireless communication network operating according to a duty cycle. The network node comprises an interface circuit configured for communication with one or more cells in the wireless communication network, and a processing circuit. The processing circuit is configured according to the present embodiments to monitor respective duty cycle budgets for a serving cell and one or more neighbor cells. Each duty cycle budget defines, for its respective cell, a percentage of time, within an observation interval, in which the respective cell is permitted to communicate data. The processing circuit is also configured to broadcast, to a User Equipment (UE), the respective duty cycle budgets of the serving cell, and each of the one or more neighbor cells, for use by the UE in cell selection or cell reselection.

Embodiments of the present disclosure also provide a third method, performed by a User Equipment (UE), of operating in a wireless communication network. In this embodiment, the method calls for the UE to receive, from a serving cell, broadcast information indicating respective duty cycle budgets for the serving cell and one or more neighbor cells. Each duty cycle budget defines, for its respective cell, a percentage of time, within an observation interval, in which the respective cell is permitted to communicate data. Once received, the UE selects or reselects a cell based on the duty cycle budgets received in the broadcast information.

Another embodiment of the present disclosure provides a user equipment in a wireless communication network. The user equipment comprises an interface circuit and a processing circuit. The interface circuit is configured for communication with one or more cells in the wireless communication network. The processing circuit is configured to receive, from a serving cell, broadcast information indicating respective duty cycle budgets for the serving cell and one or more neighbor cells. Each duty cycle budget defines, for its respective cell, a percentage of time, within an observation interval, in which the respective cell is permitted to communicate data. The processing circuit is also configured to select or reselect a cell based on the duty cycle budgets received in the broadcast information.

Still another embodiment of the present disclosure provides a method implemented in a communication system including a host computer, a base station, and a user equipment (UE). According to this embodiment, the host computer receives, from the base station, user data originating from a transmission which the base station has received from the UE, wherein the UE performs any of the steps of the third method.

Yet another embodiment of the present disclosure provides a communication system including a host computer. The host computer comprises processing circuitry configured to provide user data, and a communication interface configured to forward the user data to a cellular network for transmission to a user equipment (UE). The cellular network comprises a base station having a radio interface and processing circuitry configured to perform any of the steps of any of the first and second methods.

DETAILED DESCRIPTION

The present disclosure generally includes the following embodiments, e.g., which may address one or more of the issues disclosed herein.

In particular, both network-based, and UE-based distribution of UEs in cellular networks, are methods used to control traffic, as well as to preserve quality of service and spectral efficiency. According to the present embodiments, the activity duty cycle status (also known simply as "duty cycle status") is utilized as a criterion for selecting other network nodes. In the context of the present disclosure, the "activity duty cycle," also known simply as "duty cycle," is defined as the ratio expressed as a percentage, of the cumulative duration of transmissions within an observation interval. However, in some cases, the network may be configured to consider that acknowledgements received in response to a transmission (e.g., HARQ ACK/NAKs) are also counted into the duty cycle, even though the equipment is receiving and not transmitting such acknowledgements.

Figure 1:
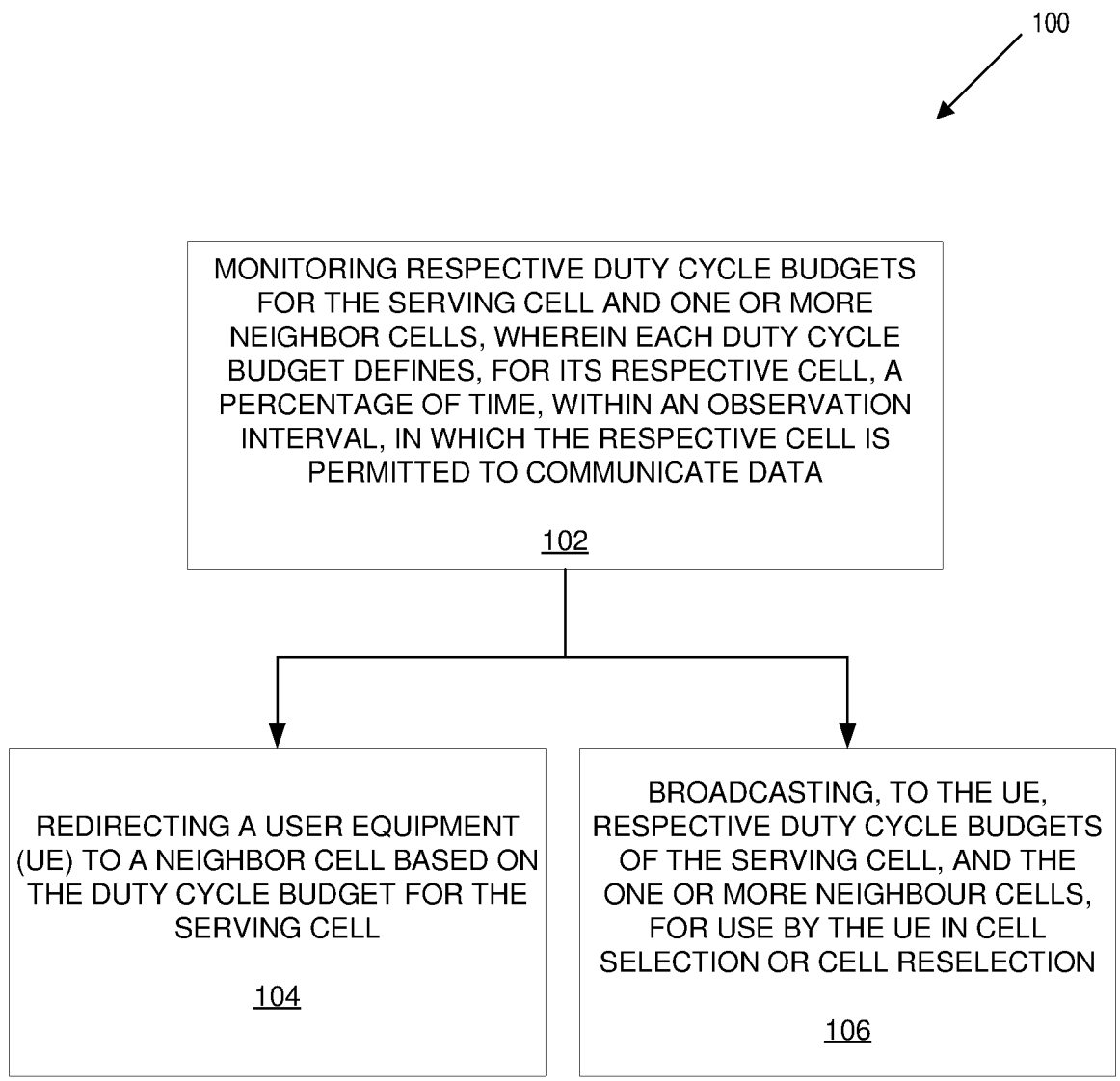
FIG. 1 illustrates a method, implemented by a serving base station, for operating in a wireless communications network according to an embodiment of the present disclosure.

Referring now to the drawings, FIG. 1 illustrates an exemplary method 100 performed in a serving cell according to an embodiment. A cell is defined to be a serving cell for a UE if that UE is connected to that cell (i.e., when the UE is in RRC_CONNECTED mode) or if the UE is camping on that cell (i.e., when the UE is in RRC_IDLE mode). According to the present disclosure, method 100 can be implemented by a network node covering the serving cell, such as a serving base station, for example.

As seen in FIG. 1, method 100 comprises monitoring respective duty cycle budgets for the serving cell and one or more neighbor cells (box 102). Each duty cycle budget defines, for its respective cell, a percentage of time, within an observation interval, in which the cell (i.e., the serving cell and the one or more neighbor cells) is permitted to communicate data. Based on the duty cycle budget for the serving cell, method 100, in one embodiment, comprises redirecting a User Equipment (UE) to a neighbor cell (box 104). In another embodiment, such as when the UE is operating in an idle mode, the serving cell broadcasts the respective duty cycle budgets of the serving cell, and the one or more neighbor cells, to a UE for the UE to use in a cell selection or cell reselection process (box 106).

In some embodiments of the method 100, the duty cycle budget defines a remaining percentage of time within the observational interval in which the respective cell is permitted to communicate data. In other embodiments, the duty cycle budget defines a remaining percentage of time within the observational interval in which the respective cell receives data. In some embodiments, the duty cycle budget defines a remaining percentage of time within the observational interval in which the respective cell transmits and receives data.

A base station, such as a serving base station, or other network node can, in some embodiments, serve a single cell or multiple cells using different frequency bands. For example, in one embodiment, a serving base station serves a current cell using a first frequency band, as well as another, neighbor cell using a second different frequency band. In such embodiments, the serving base station can redirect a UE using the first frequency band in the current cell to itself serving the neighbor cell using the second frequency band, or to an entirely different base station serving a neighbor cell. In either case, however, the serving base station redirects the UE to the neighbor cell based on the duty cycle budget for the serving cell.

In some embodiments, the method 100 comprises redirecting the UE responsive to determining that the duty cycle budget of the serving cell does not exceed a predetermined threshold capacity. That is, the serving cell is configured to determine when its remaining duty cycle budget dips below a predetermined threshold capacity value (e.g., such as when the serving cell determines that it has 2% duty cycle budget remaining of its original 10% duty cycle budget). When this occurs, the serving cell identifies one or more neighbor cells and redirects the UE to the neighbor cell that is determined to have the "best" duty cycle budget (i.e., the neighbor cell having the greatest amount of its duty cycle budget remaining).

In some embodiments, the redirection procedure described herein is used for UEs that are handling a relatively high priority service. In these situations, the method 100 for redirecting the UE to a neighbor cell comprises determining whether the UE is handling high priority traffic. If the UE is handling high priority traffic, method 100 comprises selecting a target cell from the one or more neighbor cells, sending information associated with the target cell to the UE, and performing a redirection procedure to redirect the UE to the target cell.

The embodiments of the present disclosure, however, are not limited to use for UEs handling high priority traffic. In other embodiments, the UE may not be handling high priority traffic. In cases where the UE is not handling high priority traffic, one embodiment of method 100 comprises the serving cell sending information associated with the one or more neighbor cells to the UE as part of the redirection procedure to redirect the UE to one of the neighbor cells. The information associated with one or more neighbor cells provided within the redirection procedure is part of the redirection information.

In another embodiment where the UE is not handling high priority traffic, method 100 comprises the serving cell sending information associated with the one or more neighbor cells to the UE, and then explicitly releasing the UE. In these cases, the UE is left to scan the one or more neighbor cells to find a suitable cell, and then perform a cell access to the selected cell.

In addition to the previous embodiments in which the serving cell explicitly redirects the UE (i.e., where the serving cell provides an explicit redirection indication to the UE, such as duty cycle budget information and/or the identities of one or more target or neighbor cells), some embodiments of the present disclosure provide an implicit redirection indication to the UE. In these embodiments, the serving cell sends information about one or more neighbor cells related to redirection and subsequently releases the UE. In some embodiments, the serving cell may not have enough duty cycle budget to send redirection information to the UE. Therefore, the serving cell may simply withhold sending the information associated with the one or more neighbor cells to the UE, and instead, cease sending signals to the UE. For example, in one embodiment, the serving cell may cease to send scheduling information to the UE. In another embodiment, the serving cell may cease to provide a transmission grant to the UE to transmit on an uplink. In either case, the UE will determine that the serving cell is no longer communicating with the UE, despite that the communications environment may still be conducive to communicating with the UE, and begin scanning for a new cell. Additionally, because the serving cell does not send the UE any redirection-related information in this embodiment (e.g., the duty cycle capacities of other cells), the UE is left to scan for the new cell using the cell information it may already have.

The previous embodiments describe the serving cell as redirecting a particular UE. However, those of ordinary skill in the art will appreciate that the present embodiments are not so limited. In one aspect of the disclosure, the serving cell determines the duty cycle budget for itself and for each of the neighbor cells, and broadcasts that information to many UEs. In turn, any of those UEs can utilize that redirection information in a cell selection or cell reselection process.

There are a variety of ways in which the serving cells and the neighbor cells inform each other about their respective duty cycle budgets. In one aspect, for example, network nodes (e.g., base stations) exchange duty cycle budget information for the cells that they cover with one another. More particularly, the network nodes covering the serving cell and the one or more neighbor cells may periodically send messages to each other (e.g., via an X2 interface) that indicates their respective duty cycle budget. By way of example only, each cell may inform all of the other cells of its original duty cycle budget (e.g., 10%), as well as any remaining duty cycle budget it can use to communicate with the UEs (e.g., 2% capacity of the original 10% remaining capacity).

In another embodiment, the cells may determine the duty cycle budget of the other cells using a request-response mechanism. In particular, the serving base station, for example, may send a message to the other base stations requesting that each base station provide the serving base station with an indication of its remaining duty cycle budget. Each base station would then respond with a reply message indicating its duty cycle budget.

In some embodiments, the serving base station may send the request message in response to determining that the duty cycles of the serving cell does not exceed the predetermined threshold (e.g., that the serving cell lacks a sufficient amount of duty cycle budget to communicate with one or more UEs). In other embodiments, however, the serving cell may send the request message in response to determining that the duty cycle budget of the serving cell now exceeds a predetermined threshold. In these latter cases, the serving cell may determine that its load has fallen to a point where it now has excess duty cycle budget or where it has regained a sufficient amount of duty cycle budget.

In addition to the above, method 100 may also comprise the serving cell ranking the one or more neighbor cells. For example, in some embodiments of the present disclosure, the method 100 ranks the cells according to their respective duty cycle budgets. In these embodiments, those cells with the greatest amount of "free" capacity might appear at the top of a list. Additionally, in other embodiments, the serving cell may rank the neighbor cells based on signal quality or signal strength. In conventional methods, cells are ranked according to signal quality or signal strength. However, conventional methods do not rank cells based on their respective duty cycle budget alone, or in addition to, signal quality and signal strength.

In some embodiments, the serving cell may control which cell the UE is redirected to. As stated above, this can include the serving cell sending the UE information to the UE that identifies a particular cell for the UE to redirect to (e.g., identifying a specific target cell). However, in other embodiments, the serving cell sends an indicator bit to the UE informing the UE to select a cell other than the serving cell. That is, by broadcasting the indicator bit, the serving cell controls the UE to redirect to a cell that is different from the serving cell.

In addition to the above, the present embodiments may be implemented for a UE that is a "delay tolerant" UE. A "delay tolerant" UE handles relatively low priority traffic, and as such, is more tolerant of signal delays and the like than a UE that is handling relatively high priority traffic.

Figure 2:
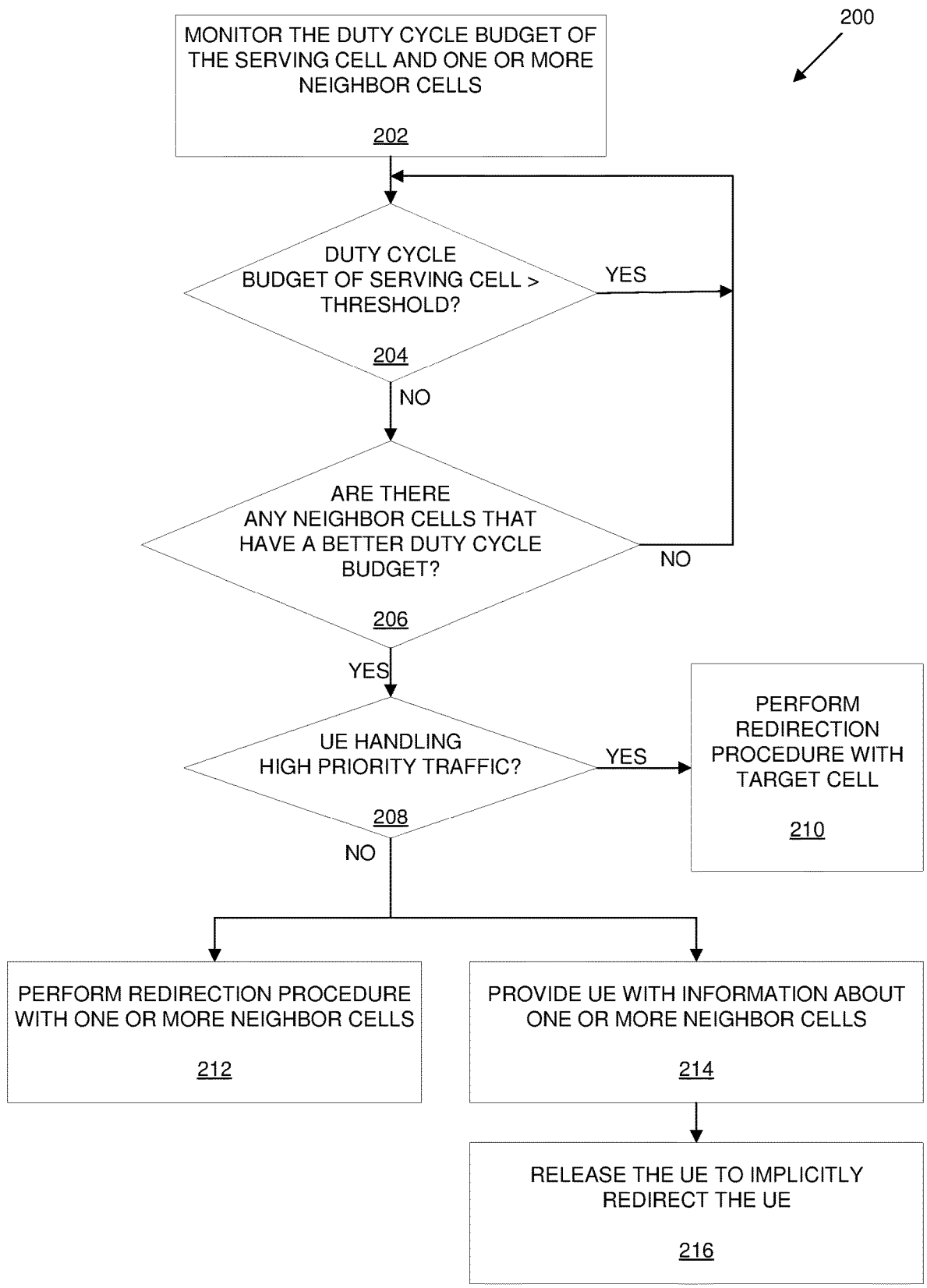
FIG. 2 illustrates another method, implemented by a serving base station, for operating in a wireless communications network according to an embodiment of the present disclosure.

FIG. 2 is a flow chart illustrating a method 200, implemented in a serving cell, for operating in a wireless communications network according to an embodiment of the present disclosure. According to the present disclosure, a network node, such as a serving base station, can implement method 200.

As seen in FIG. 2, method 200 comprises monitoring respective duty cycle budgets for the serving cell and each of the one or more neighbor cells (box 202). Each duty cycle budget defines, for its respective cell, a percentage of time, within an observation interval, in which the respective cell is permitted to communicate data. As long as the duty cycle budget for the serving cell remains above a predetermined threshold (box 204), the serving cell continues to handle UE traffic. However, when the duty cycle budget of the serving cell falls below the predetermined threshold, the serving cell searches for any of the monitored neighbor cells that have a "better" duty cycle status (i.e., those cells having a greater amount of remaining duty cycle budget than the serving cell) (box 206). If no such neighbor cells exist, the serving cell will continue handling the UE until the serving cell has exhausted its duty cycle budget. In some embodiments, the serving cell can simply explicitly redirect the UE to a neighbor cell, while in other embodiments, the serving cell can ignore the UE causing the UE to find and reselect a neighbor cell on its own. By way of example only, the serving cell may cease sending scheduling information to the UE and/or cease sending uplink transmission grants to the UE. This may be used to decrease the load in the current cell to be able to better serve UEs with high priority traffic. However, if such neighbor cells do exist, the serving cell will redirect the UE, in one embodiment, based on whether the UE is or is not handling high priority traffic (box 208).

In embodiments where the UE is handling high priority traffic, the serving cell performs a redirection procedure with the target cell so that the UE will be served by the target cell (box 210). That is, the redirection procedure comprises sending a release message to the UE including information about the target cell. This triggers the UE to release the radio connection to the current serving cell and perform an initial access procedure with the target cell. If, however, the UE is not handling high priority traffic, the serving cell can still redirect the UE. Particularly, in one embodiment, the serving cell performs a redirection procedure with one or more neighbor cells (box 212). That is, the serving cell provides the UEs with redirection information about one or more neighbor cells, also referred to as candidate cells. Typically, these neighbor cells are different than the one or more cells selected for UEs handling high priority traffic. The redirection information may comprise, for example, data identifying the neighbor cells and their respective duty cycle budgets. The UE could utilize the received redirection information to scan these neighbor cells and select a target cell from among those cells before executing a cell access procedure with the selected target cell. In a special case, the serving cell provides the UE with redirection information for only a single neighbor cell. This neighbor cell is then the target cell, and the UE will perform an initial access procedure with this neighbor cell, which had been previously selected by the serving cell.

In another "implicit" redirection embodiment, however, the serving cell may provide the UE with information about one or more neighbor cells, also referred to as candidate cells (box 214), and then release the UE (box 216). The information may comprise, for example, data identifying the neighbor cells and their respective duty cycle budgets. In such "implicit" embodiments, the UE will perform a cell reselection procedure, typically to one of the indicated neighbor cells, if available, but it may have to use whatever information it has on hand about the neighbor cells (i.e., information that was received by the UE prior to being released by its serving cell).

It should be noted that while FIG. 2 describes the serving base station as the entity searching for the neighbor cells responsive to the duty cycle budget falling below the predetermined threshold, this is merely for illustrative purposes. The present embodiments are indeed not so limited, as any node in the network can search for the neighbor cells when the serving cell's duty cycle budget falls below the predetermined threshold.

Figure 3:
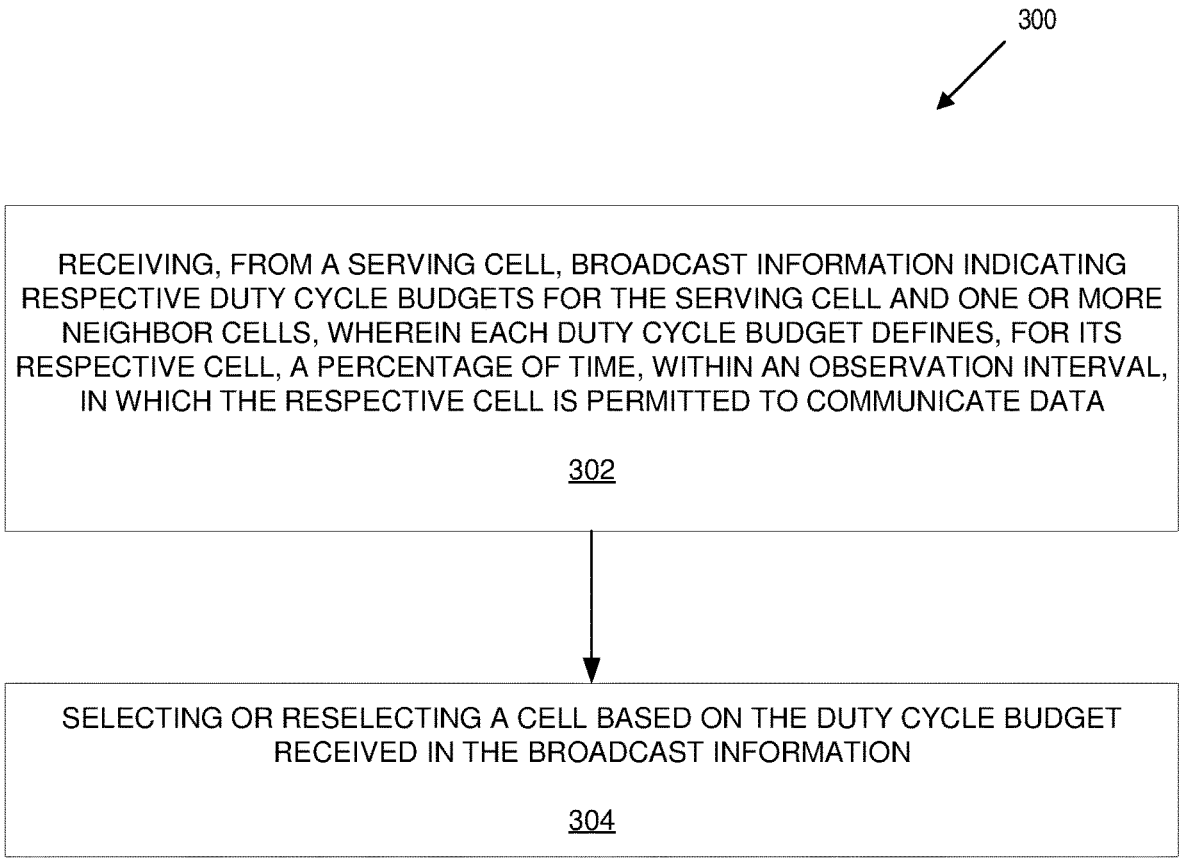
FIG. 3 illustrates a method, implemented by a User Equipment (UE), for operating in a wireless communications network according to an embodiment of the present disclosure.

In addition to embodiments implemented at the serving cell, the present disclosure also provides a method implemented at the UE. For example, FIG. 3 is a flow diagram illustrating a method 300 implemented at the UE for operating in a wireless communications network. As seen in FIG. 3, method 300 comprises the UE receiving, from a serving cell, broadcast information indicating the respective duty cycle budgets for the serving cell and one or more neighbor cells (box 302). Each duty cycle budget defines, for its respective cell, a percentage of time, within an observation interval, in which the cell is permitted to communicate data. The UE then selects or reselects a cell based on the duty cycle budget received in the broadcast information (box 304).

Figure 4:
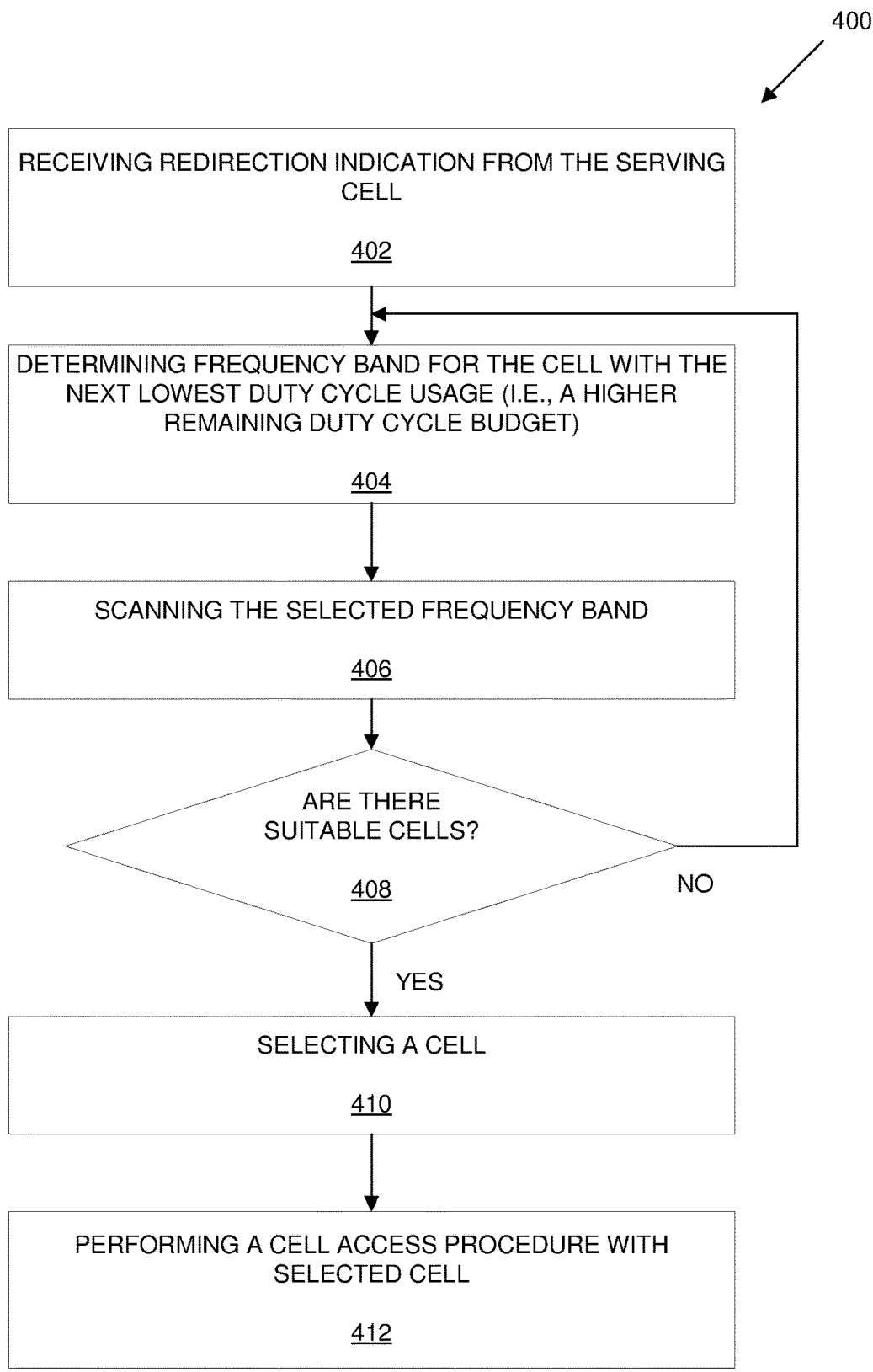
FIG. 4 illustrates another method, implemented by a User Equipment (UE), for operating in a wireless communications network according to an embodiment of the present disclosure.

FIG. 4 is a flow diagram illustrating a method 400 for operating in a wireless communications network according to one embodiment of the present disclosure. Method 400 is also implemented by the UE and comprises the UE receiving a redirection indication from the serving cell (box 402). Upon receipt, method 400 comprises the UE determining a frequency band for the cell with the next lowest duty cycle usage (i.e., which cell has more remaining duty cycle budget) (box 404). Method 400 then comprises the UE scanning the selected frequency band (box 406) and determining whether there are any suitable cells in the selected frequency band (box 408). If not, method 400 comprises the UE determining the frequency band for the cell having the next lowest duty cycle usage, and repeating scanning that frequency band for one or more suitable cells (boxes 404, 406, 408).

Once the UE identifies one or more suitable cells, however, method 400 comprises the UE selecting a cell as a target cell (box 410) and performing a cell access procedure with the selected cell (box 412).

Note that an apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
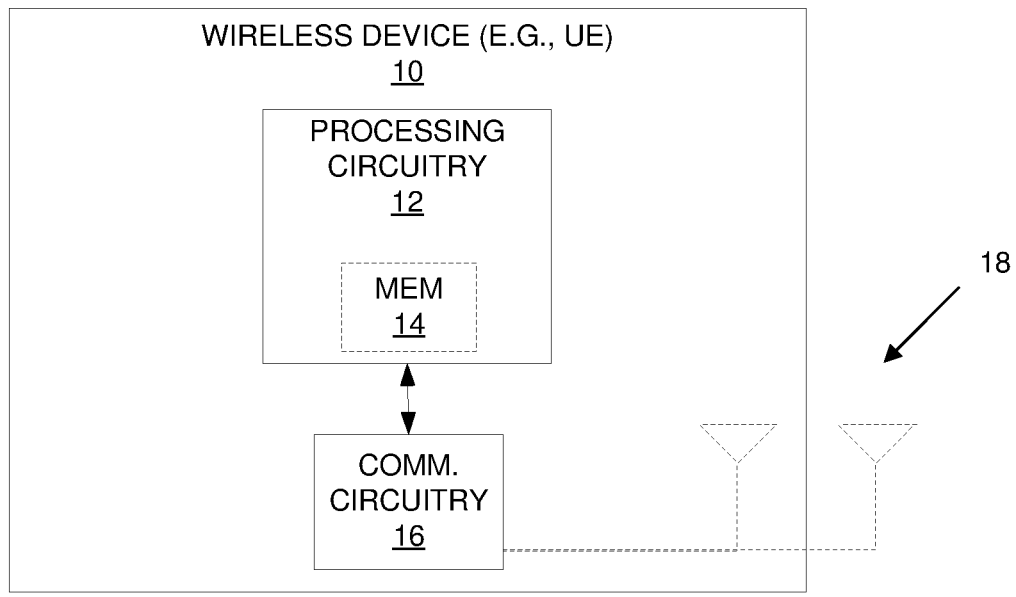
FIG. 5 is a schematic block diagram of an exemplary UE according to an embodiment of the present disclosure.

FIG. 5 for example illustrates a wireless device 10 (e.g., a UE) as implemented in accordance with one or more embodiments. As shown, the wireless device 10 includes processing circuitry 12 and communication circuitry 16. The communication circuitry 16 (e.g., radio circuitry such as a transceiver) is configured to transmit and/or receive information to and/or from one or more other nodes, e.g., via any communication technology. Such communication may occur via one or more antennas 18 that are either internal or external to the wireless device 10. The processing circuitry 12 is configured to perform processing described above, such as by executing instructions stored in memory 14. The processing circuitry 12 in this regard may implement certain functional means, units, or modules, which may for example implement method 300 and/or method 400.

Figure 6:
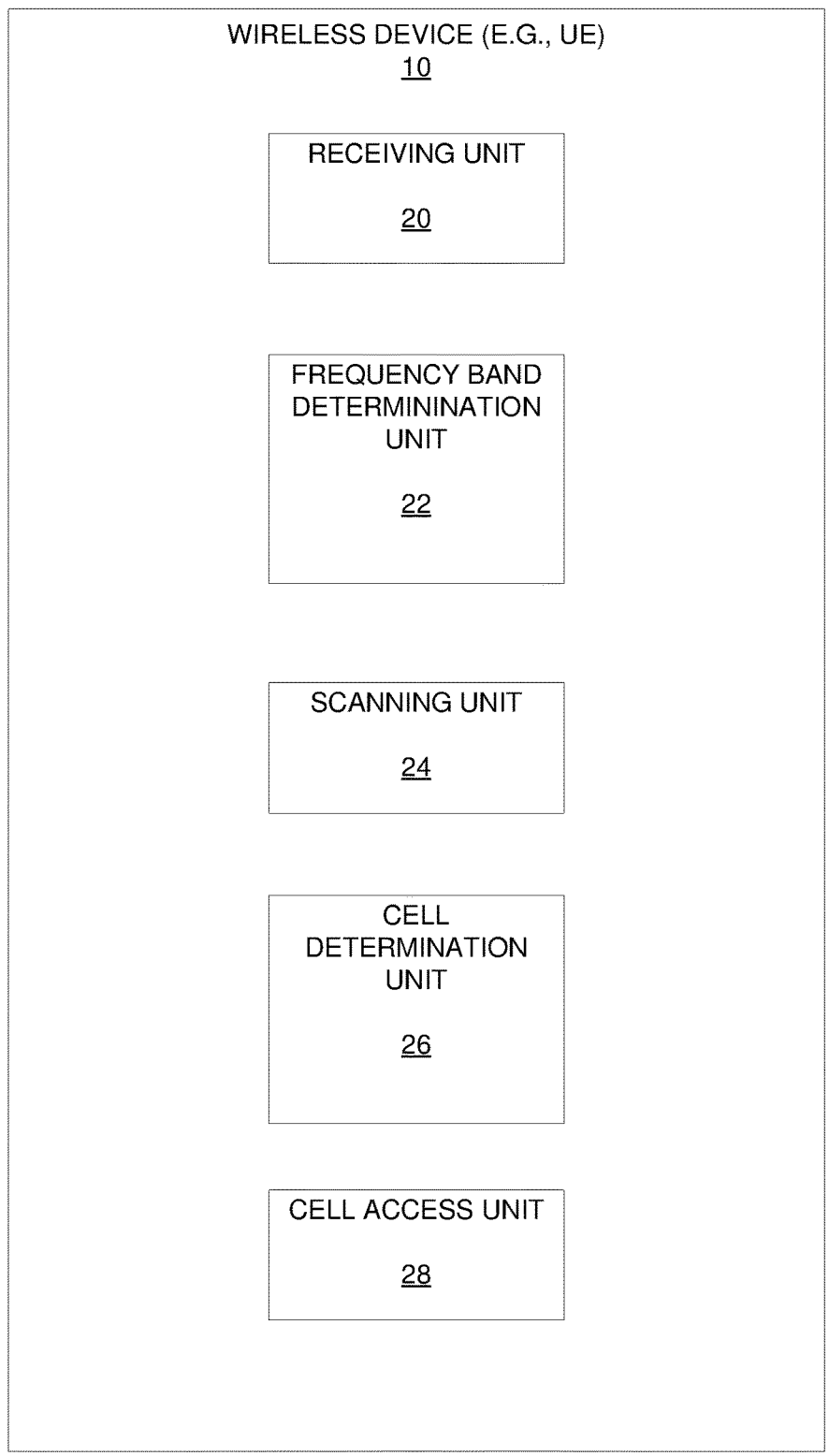
FIG. 6 is a functional block diagram of an exemplary UE according to an embodiment of the present disclosure.
Figure 9:
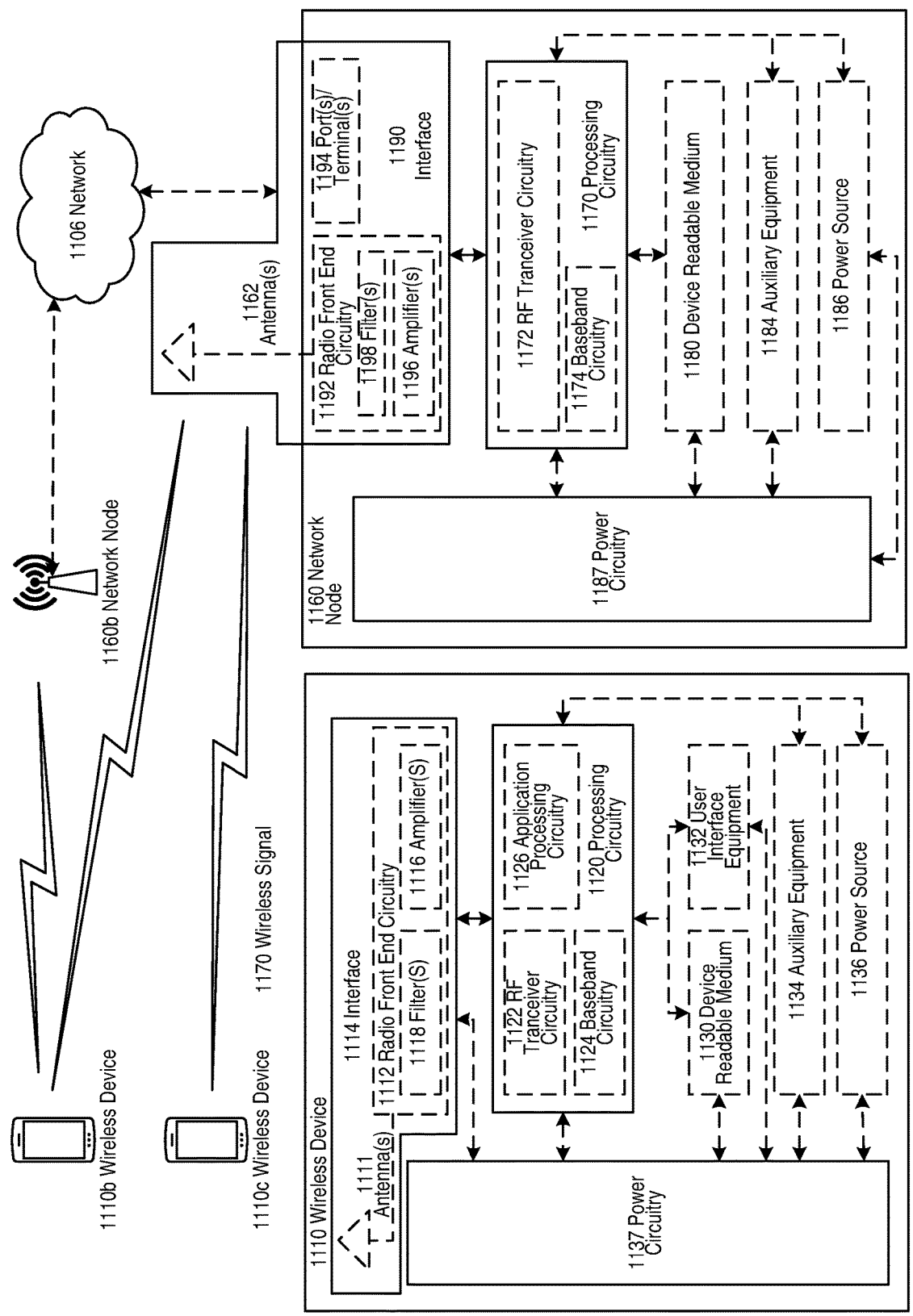
FIG. 9 is a schematic block diagram illustrating an example wireless network, according to particular embodiments of the present disclosure.

FIG. 6 illustrates a schematic block diagram of a wireless device 10 in a wireless network according to still other embodiments (for example, the wireless network shown in FIG. 9). As shown, the wireless device 10 implements various functional means, units, or modules, e.g., via the processing circuitry 12 in FIG. 4 and/or via software code. These functional means, units, or modules, e.g., for implementing the method(s) herein, include for instance a receiving unit 20, a frequency band determination unit 22, a scanning unit 24, a cell determination unit 26, and a cell access unit 28.

The receiving unit 20 is configured to receive a redirection indication from the serving cell. The receiving unit 20 is also configured to receive broadcast information from the serving cell indicating the respective duty cycle budgets for the serving cell and one or more neighbor cells. The frequency band determination unit 22 is configured to determine a frequency band for a cell having the next lowest duty cycle usage. Such a determination correlates to a neighbor cell having more duty cycle budget than the serving cell. The scanning unit 24 is configured to scan the cells, and the cell determination unit 26 is configured to select a cell according to the results of the scanning unit 24. The cell access unit 28 is configured to perform a cell access procedure with a base station in the cell selected by the cell determination unit 26.

Figure 7:
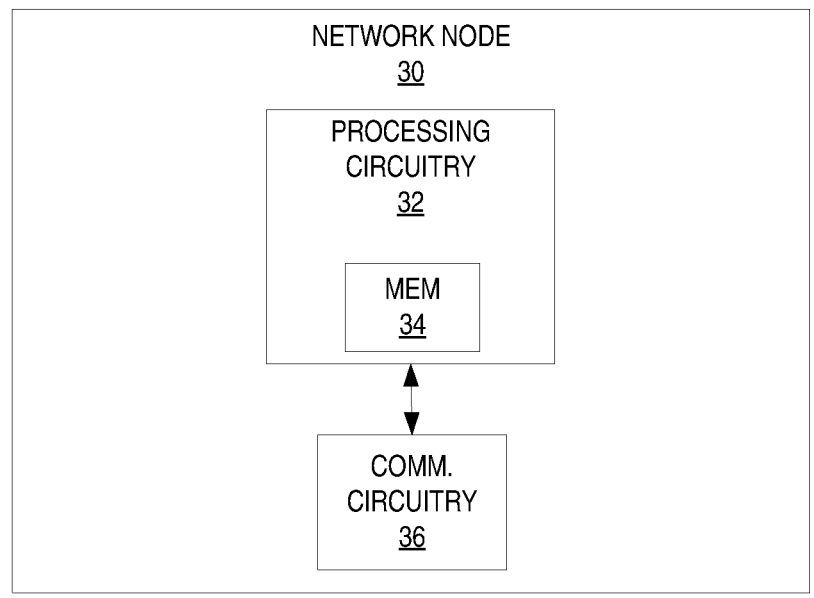
FIG. 7 is a schematic block diagram of an exemplary base station according to an embodiment of the present disclosure.

FIG. 7 illustrates a network node 30, such as a base station, for example, as implemented in accordance with one or more embodiments. As shown, the network node 30 includes processing circuitry 32 and communication circuitry 36. The communication circuitry 36 is configured to transmit and/or receive information to and/or from one or more other nodes, e.g., via any communication technology. The processing circuitry 32 is configured to perform processing described above, such as by executing instructions stored in memory 34. The processing circuitry 32 in this regard may implement certain functional means, units, or modules, which may for example implement method 100 and/or method 200.

Figure 8:
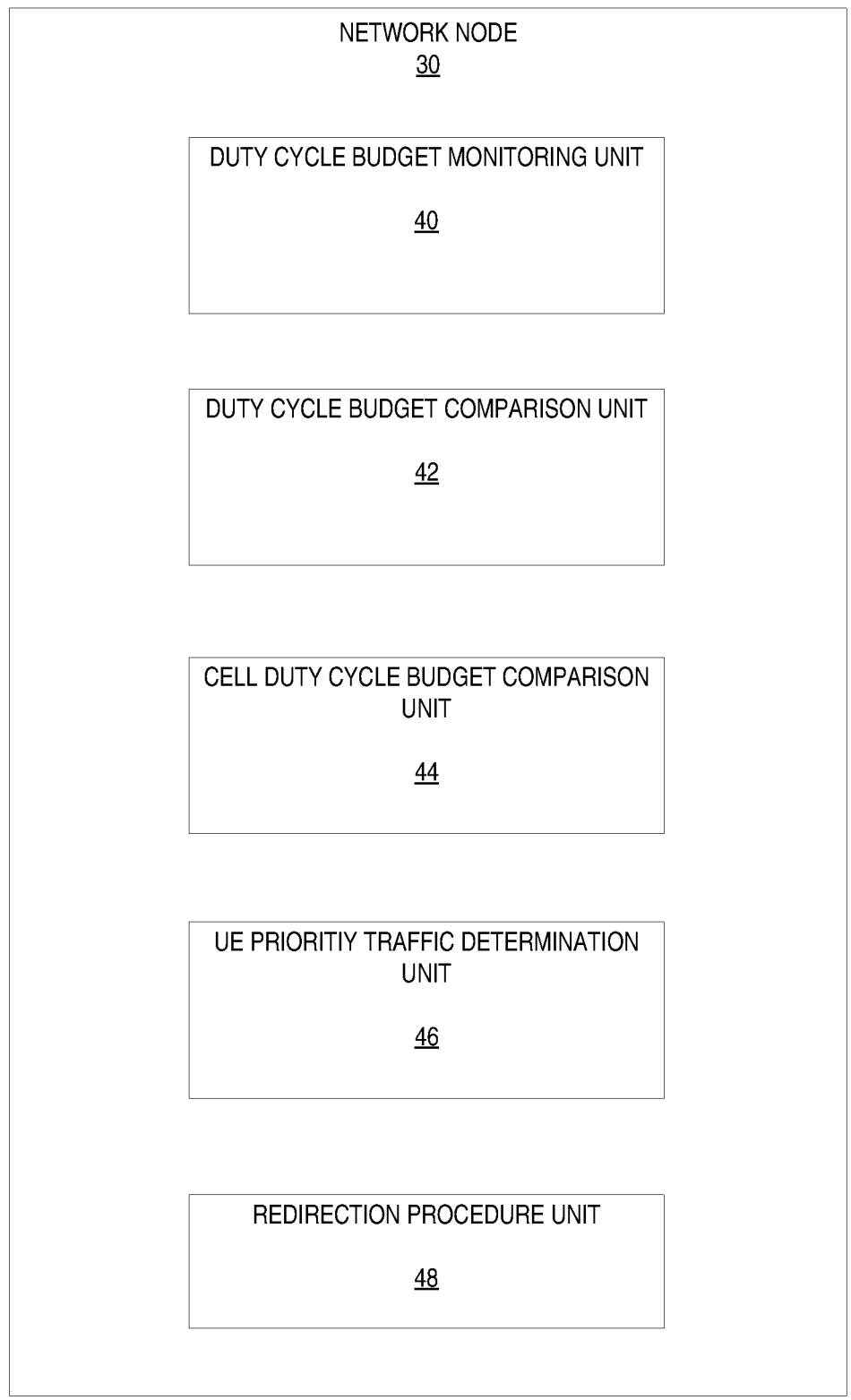
FIG. 8 is a functional block diagram of an exemplary base station according to an embodiment of the present disclosure.

FIG. 8 illustrates a schematic block diagram of a network node 30, such as a serving base station, for example, in a wireless network according to still other embodiments (for example, the wireless network shown in FIG. 9). As shown, the network node 30 implements various functional means, units, or modules, e.g., via the processing circuitry 32 in FIG. 7 and/or via software code. These functional means, units, or modules, e.g., for implementing the method(s) herein, include for instance, a duty cycle budget monitoring unit 40, a duty cycle budget comparison unit 42, a cell duty cycle budget comparison unit 44, a UE priority traffic determination unit 46, and a redirection procedure unit 48.

The duty cycle budget monitoring unit 40 is configured to monitor the duty cycle budget of the serving cell. The duty cycle budget comparison unit 42 is configured to compare the monitored duty cycle budget of the serving cell to a predetermined capacity threshold. The cell duty cycle budget comparison unit 44 is configured to obtain and compare the duty cycle budgets of the one or more neighbor cells. The UE priority traffic determination unit 46 is configured to determine whether a UE is handling high priority traffic. The redirection procedure unit 48 is configured to perform a redirection procedure to redirect the UE to another cell. As previously stated, the redirection may be indicated to the UE either implicitly or explicitly. Additionally, in one embodiment, the redirection procedure unit 48 is configured to broadcast information indicating the respective duty cycle budgets for the serving cell and the one or more neighbor cells to the UE.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 9 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 10:
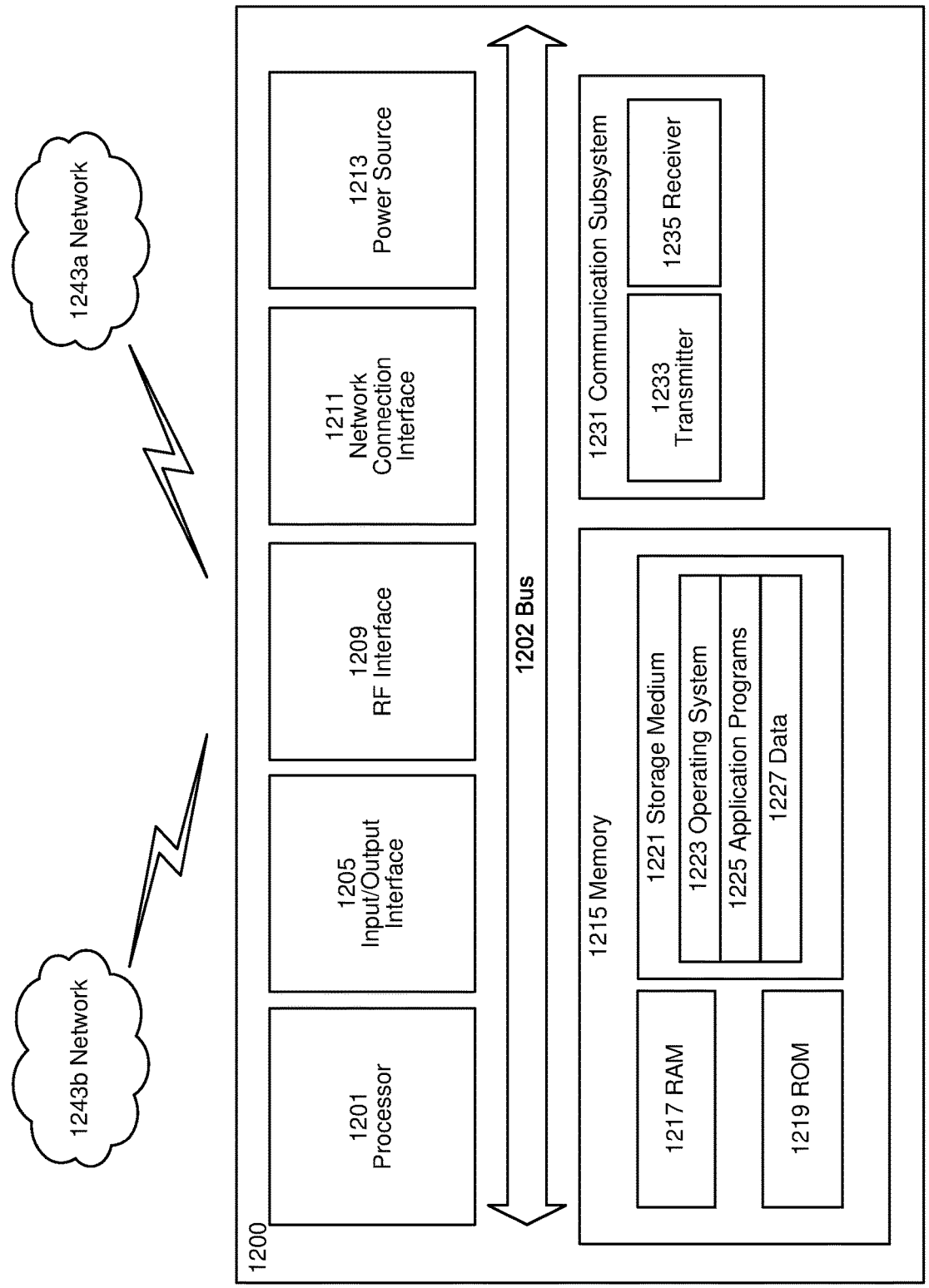
FIG. 10 is a schematic block diagram illustrating an example of a user equipment, according to particular embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 10, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 11:
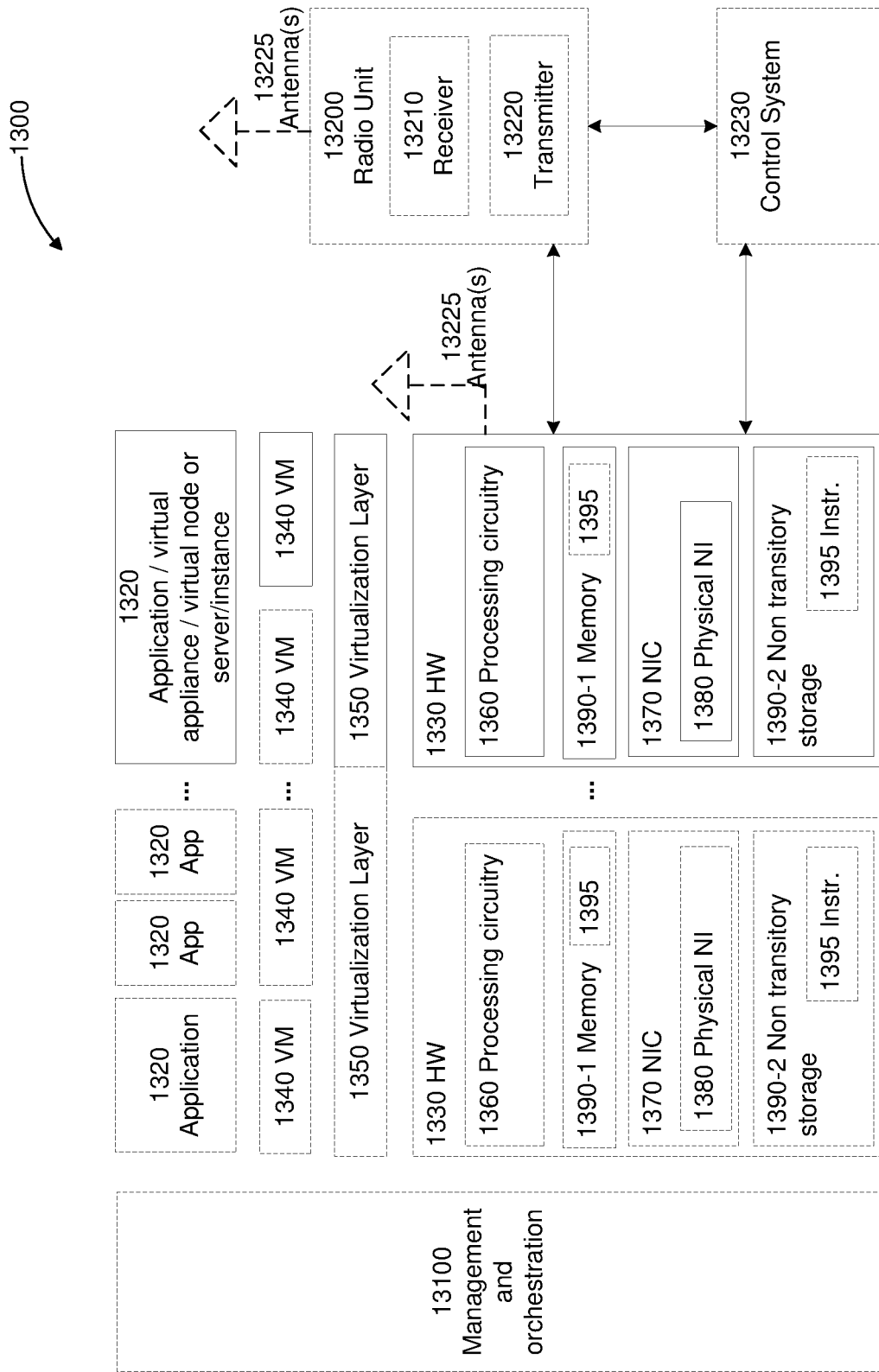
FIG. 11 is a schematic block diagram illustrating an example of a virtualization environment, according to particular embodiments of the present disclosure.

FIG. 11 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 11, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 11.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 12:
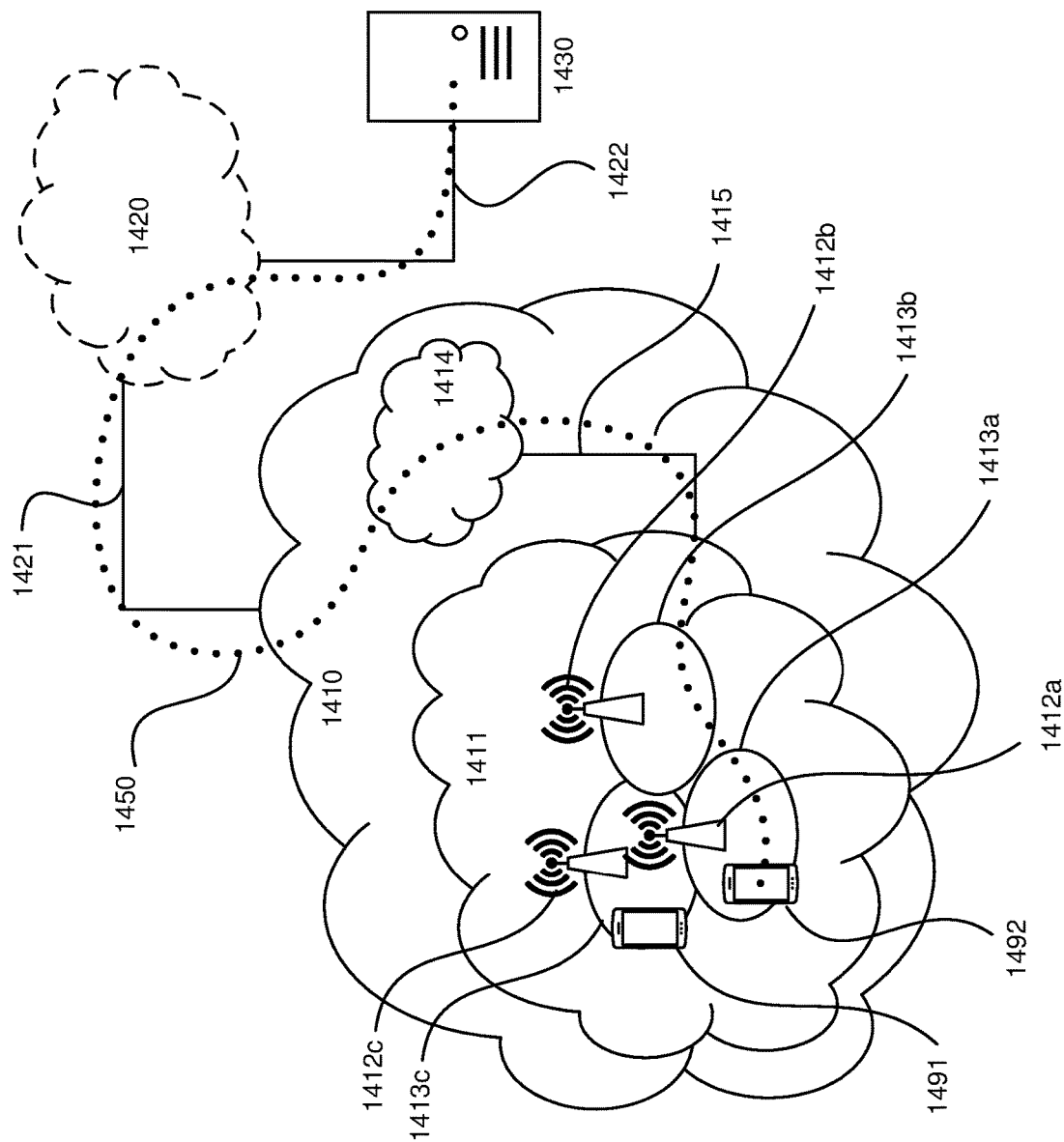
FIG. 12 is a schematic illustrating an example telecommunication network, according to particular embodiments of the present disclosure.

FIG. 12 illustrates a telecommunication network connected via an intermediate network to a host computer in accordance with some embodiments. In particular, with reference to FIG. 12, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 12 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 13:
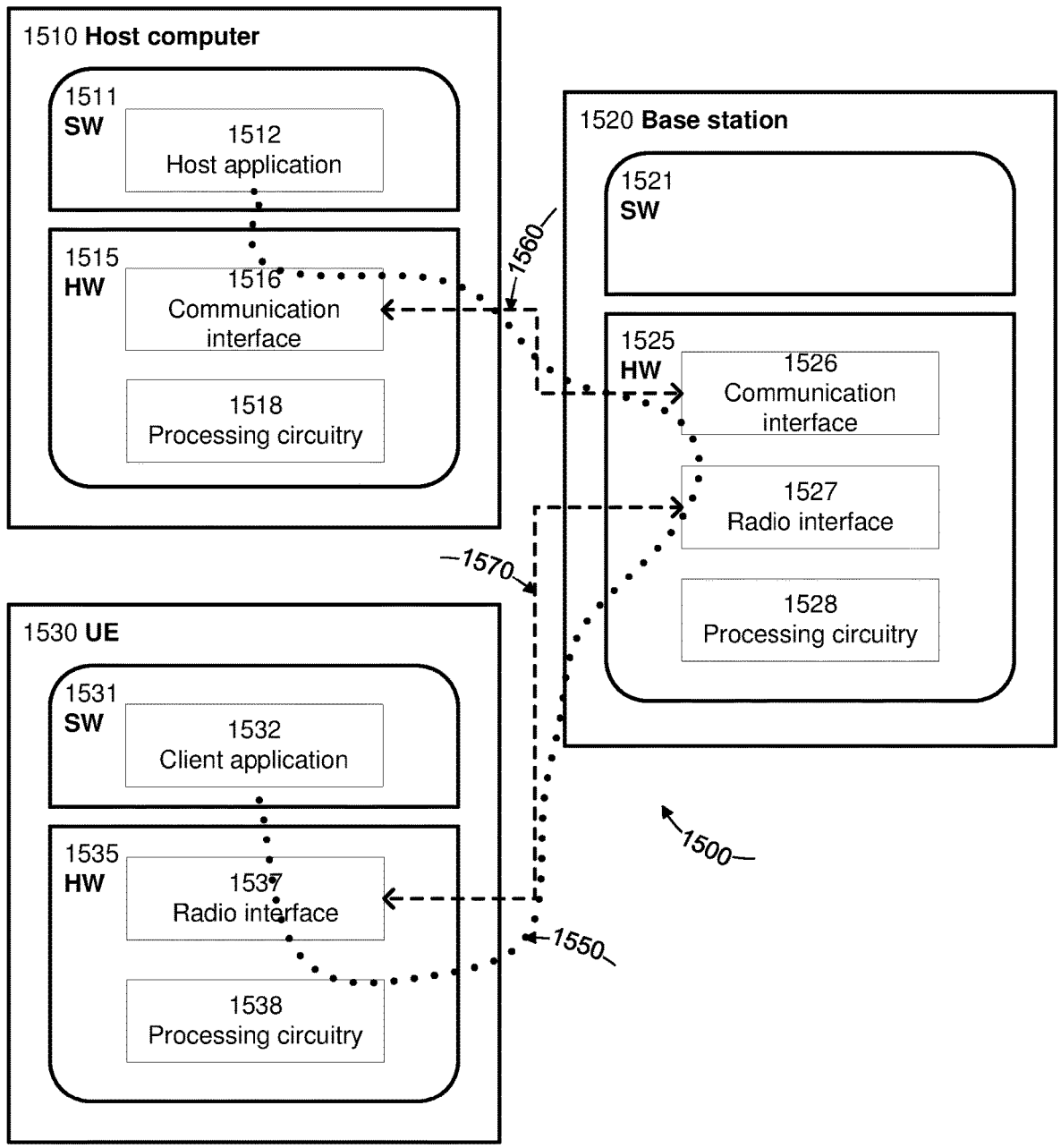
FIG. 13 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 13) served by base station 1520. Communication interface 1526 may be configured to facilitate connection 1560 to host computer 1510. Connection 1560 may be direct or it may pass through a core network (not shown in FIG. 13) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 13 may be similar or identical to host computer 1430, one of base stations 1412a, 1412b, 1412c and one of UEs 1491, 1492 of FIG. 12, respectively. This is to say, the inner workings of these entities may be as shown in FIG. 13 and independently, the surrounding network topology may be that of FIG. 12.

In FIG. 13, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may support spectrally efficient cellular operation in a spectrum associated with duty cycle restrictions. Such spectral efficiency is improved by distributing the UE, and thus, the UE traffic, to network nodes with more spare duty cycles. This, in turn, provides users with more reliable communications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 14:
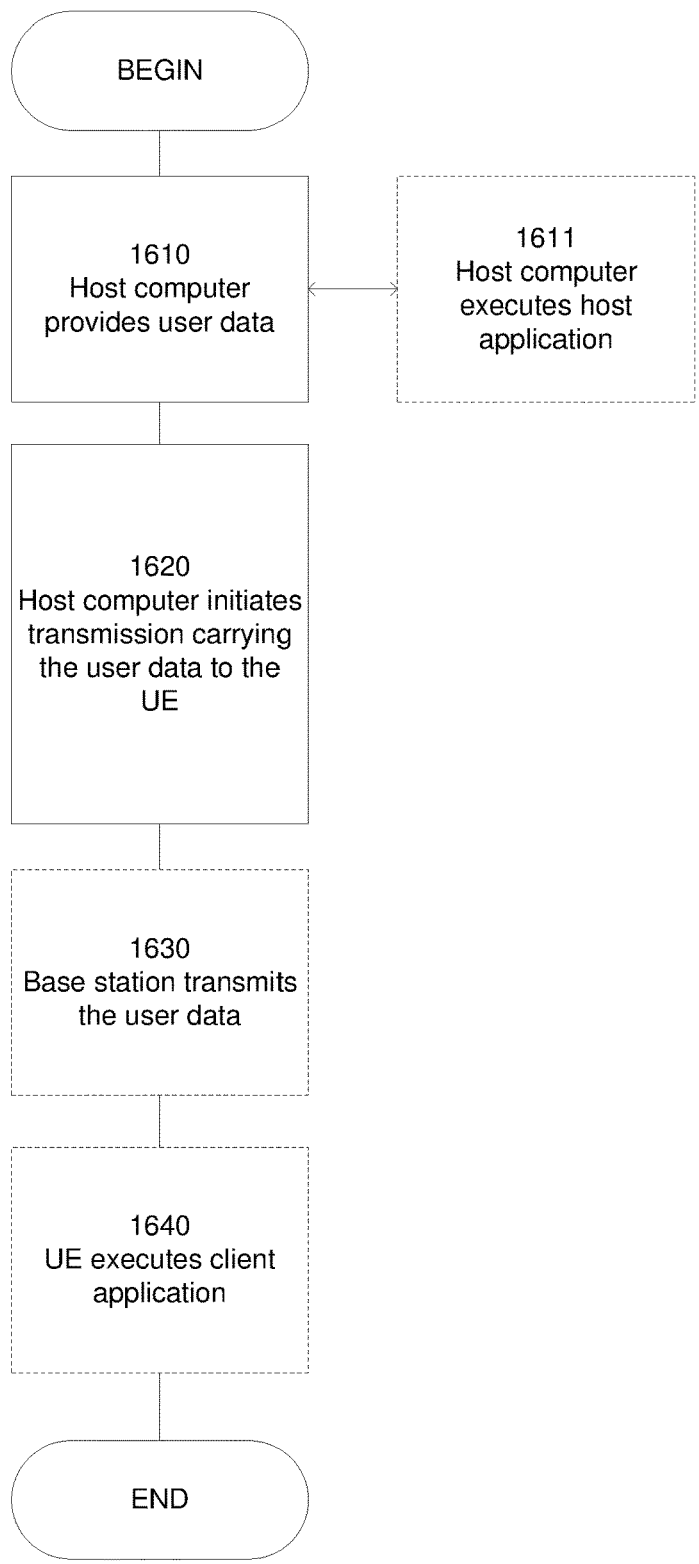
FIGS. 14-17 are flow diagrams, each of which illustrates an example method implemented in a communication system, according to particular embodiments of the present disclosure.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 15:
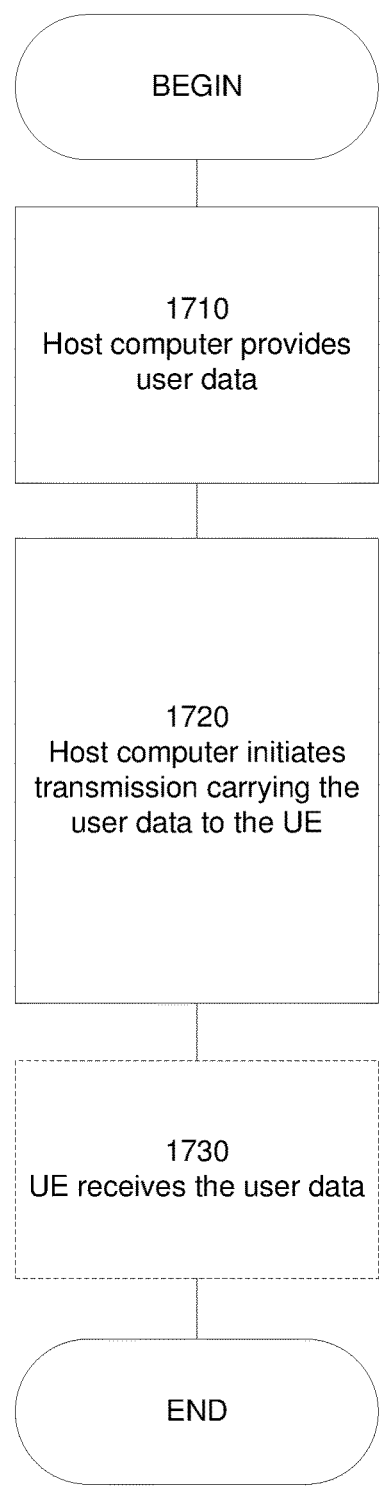

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 16:
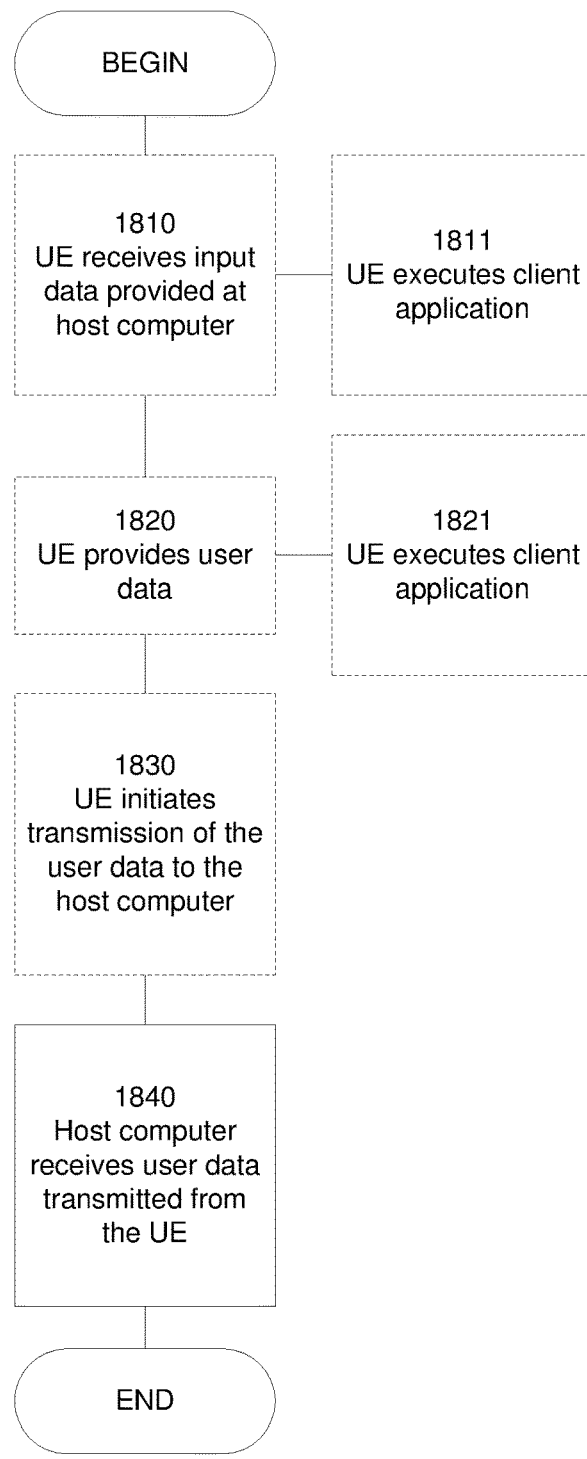

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 17:
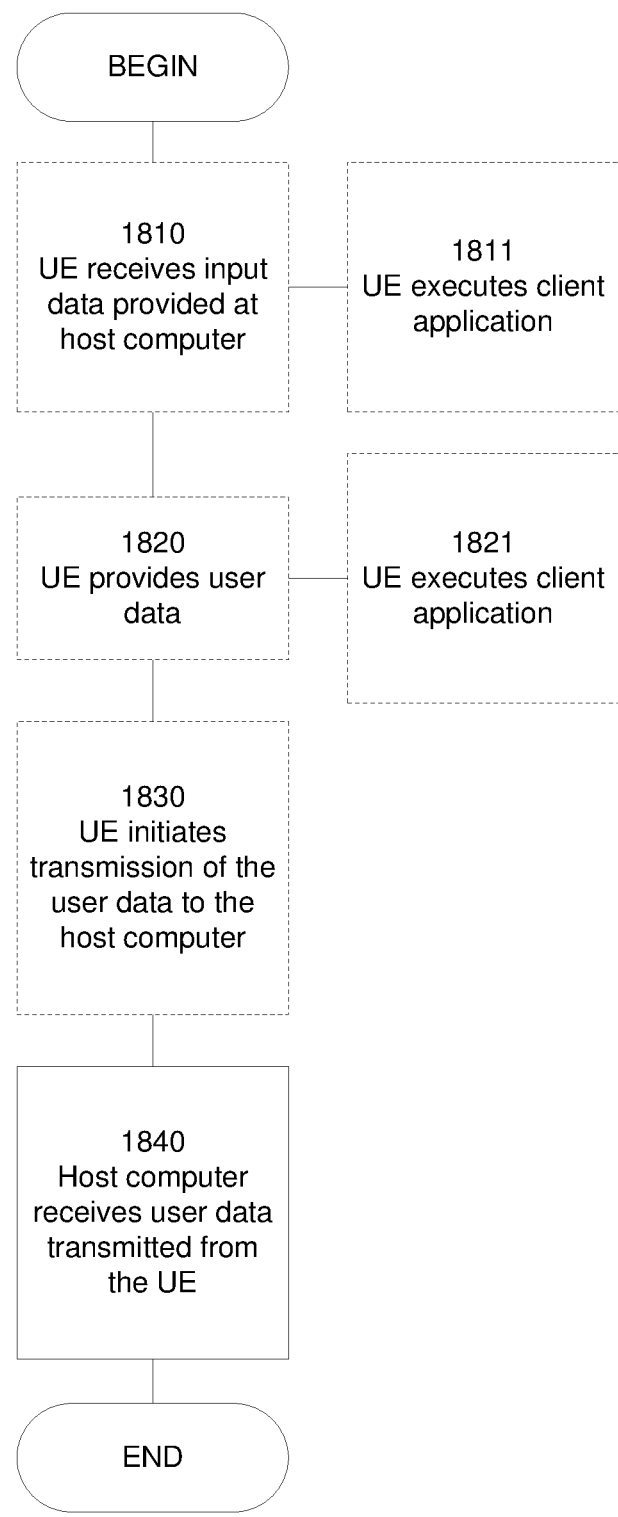

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method, performed in a serving cell, of operating a wireless communication network operating according to a duty cycle, the method comprising:
   monitoring respective duty cycle budgets for the serving cell and one or more neighbor cells; wherein each duty cycle budget defines, for its respective cell, a percentage of time, within an observation interval, in which the respective cell is permitted to communicate data; and
   redirecting a User Equipment (UE) to a neighbor cell based on the duty cycle budget for the serving cell.

2. The method of claim 1, wherein each respective duty cycle budget defines a remaining percentage of time within the observational interval in which the respective cell is permitted to transmit and/or receive data.

3. The method of claim 1, wherein the redirecting the UE to the neighbor cell comprises redirecting the UE to the neighbor cell responsive to determining that the duty cycle budget of the serving cell does not exceed a predetermined threshold.

4. The method of claim 1, further comprising identifying the one or more neighbor cells responsive to determining that the duty cycle budget for the serving cell does not exceed the predetermined threshold.

5. The method of claim 1, wherein the redirecting the UE to the neighbor cell comprises:
   determining whether the UE is handling high priority traffic;
   in response to determining that the UE is handling high priority traffic, performing a redirection procedure to redirect the UE to the target cell, wherein performing the redirection procedure comprises:
      selecting a target cell from the one or more neighbor cells;
      sending information associated with the target cell to the UE; and
   in response to determining that the UE is not handling high priority traffic:
      sending information associated with the one or more neighbor cells to the UE; and
      performing a redirection procedure to redirect the UE to one of the neighbor cells.

6. The method of claim 1, wherein in response to determining that the UE is not handling high priority traffic:
   sending information associated with the one or more neighbor cells to the UE; and
   releasing the UE.

7. The method of claim 1, further comprising exchanging information about the duty cycle budgets with the one or more neighbor cells.

8. The method of claim 7, wherein the exchanging information about the duty cycle budgets with the one or more neighbor cells comprises periodically exchanging the information with the one or more neighbor cells.

9. The method of claim 7, wherein the exchanging information about the duty cycle budget with the one or more neighbor cells comprises:
   sending a request message to a neighbor cell requesting the duty cycle budget of the neighbor cell; and
   receiving a response message from the neighbor cell indicating the neighbor cell's duty cycle budget responsive to the request message.

10. The method of claim 9, wherein the sending the request message to the neighbor cell comprises sending the request message responsive to determining that the duty cycle budget of the serving cell does not exceed the predetermined threshold.

11. The method of claim 9, wherein the exchanging information about the duty cycle budget with the one or more neighbor cells comprises sending information about the duty cycle budget of the serving cell to the one or more neighbor cells responsive to determining that the duty cycle budget of the serving cell exceeds the predetermined threshold.

12. The method of claim 1, further comprising ranking the one or more neighbor cells according to a respective received signal strength and the duty cycle budget for the neighbor cell.

13. The method of claim 12, further comprising redirecting the UE to a target cell based on the ranking of the one or more neighbor cells.

14. The method of claim 1, further comprising configuring the UE to use a different frequency band that is different from a frequency band of the serving cell.

15. A network node in a serving cell of a wireless communication network operating according to a duty cycle, the network node comprising:
   an interface circuit configured for communication with one or more cells in the wireless communication network; and
   processing circuitry configured to:
      monitor respective duty cycle budgets for the serving cell and one or more neighbor cells; wherein each duty cycle budget defines, for its respective cell, a percentage of time, within an observation interval, in which the respective cell is permitted to communicate data; and
      redirect a User Equipment (UE) to a neighbor cell based on the duty cycle budget for the serving cell.

16. The network node of claim 15, wherein the processing circuitry is operative to redirect the UE by:
   determining whether the UE is handling high priority traffic;
   performing, in response to determining that the UE is handling high priority traffic, a redirection procedure to redirect the UE to the target cell, wherein performing the redirection procedure comprises:
      selecting a target cell from the one or more neighbor cells;
      sending information associated with the target cell to the UE; and
   in response to determining that the UE is not handling high priority traffic:

sending information associated with the one or more neighbor cells to the UE;

performing a redirection procedure to redirect the UE to one of the neighbor cells.

17. The network node of claim 15, wherein the processing circuitry is configured to send information about the duty cycle budget of the serving cell to the one or more neighbor cells responsive to determining that the duty cycle budget of the serving cell exceeds the predetermined threshold.

18. A non-transitory computer readable recording medium storing a computer program product for controlling operation of a wireless communication network operating according to a duty cycle, the computer program product comprising program instructions which, when run on processing circuitry of a network node of a serving cell, causes the network node to:

monitor respective duty cycle budgets for the serving cell and one or more neighbor cells; wherein each duty cycle budget defines, for its respective cell, a percentage of time, within an observation interval, in which the respective cell is permitted to communicate data; and redirect a User Equipment (UE) to a neighbor cell based on the duty cycle budget for the serving cell.

19. A communication system, comprising:

a host computer comprising:

processing circuitry configured to provide user data; and a communication interface configured to forward the user data to a cellular network for transmission to a user equipment (UE);

wherein the cellular network comprises:

a base station of a serving cell having a radio interface and base station processing circuitry;

wherein the base station processing circuitry is configured to:

monitor respective duty cycle budgets for the serving cell and one or more neighbor cells; wherein each duty cycle budget defines, for its respective cell, a percentage of time, within an observation interval, in which the respective cell is permitted to communicate data; and redirect a User Equipment (UE) to a neighbor cell based on the duty cycle budget for the serving cell.

20. The communication system of claim 19, wherein the base station processing circuitry is operative to redirect the UE by:

determining whether the UE is handling high priority traffic;

performing, in response to determining that the UE is handling high priority traffic, a redirection procedure to redirect the UE to the target cell, wherein performing the redirection procedure comprises:

selecting a target cell from the one or more neighbor cells;

sending information associated with the target cell to the UE; and in response to determining that the UE is not handling high priority traffic:

sending information associated with the one or more neighbor cells to the UE;

performing a redirection procedure to redirect the UE to one of the neighbor cells.

\* \* \* \* \*